United States Patent [19]

Royer

[11] Patent Number: 4,995,190
[45] Date of Patent: Feb. 26, 1991

[54] SOIL STERILIZATION APPARATUS

[76] Inventor: C. Richard Royer, Box 363, Spruce Hill Rd., Ottsville, Pa. 18942

[21] Appl. No.: 263,004

[22] Filed: Oct. 27, 1988

[51] Int. Cl.⁵ ............................................. A01C 00/00
[52] U.S. Cl. ....................................... 47/1.01; 47/48.5
[58] Field of Search ....................... 47/1.42, 9, 2, 48.5, 47/1.01

[56] References Cited

U.S. PATENT DOCUMENTS

| | | | |
|---|---|---|---|
| 682,171 | 9/1901 | Cartter | 47/1.42 |
| 1,858,330 | 5/1932 | Hörning | 47/1.42 |
| 1,991,851 | 9/1935 | Hammell | 47/2 |
| 2,947,109 | 8/1960 | Davis | 47/1.42 |
| 2,984,939 | 5/1961 | Russell | 47/9 |
| 3,512,363 | 5/1970 | Whear | 47/9 |
| 3,563,461 | 2/1971 | Cole | 47/2 |
| 4,771,572 | 9/1988 | Higa | 47/48.5 |

Primary Examiner—Henry E. Raduazo
Attorney, Agent, or Firm—Molasky Joseph W. & Assocs.

[57] ABSTRACT

An apparatus for introducing a fumigant into the soil so as to provide a sterilized system which is essentially free of weed seeds, insects, nematodes and fungi including pathogenic and saprophytic bacteria and such other micro-organisms as may interfere with the growth of desirable vegetative forms. The apparatus consists of a horizontally disposed tubular structure which receives the fumigant under pressure in discrete quantities for controlled release. The apparatus is easily extensible and may be adapted to cover soil areas of any desired size.

17 Claims, 2 Drawing Sheets

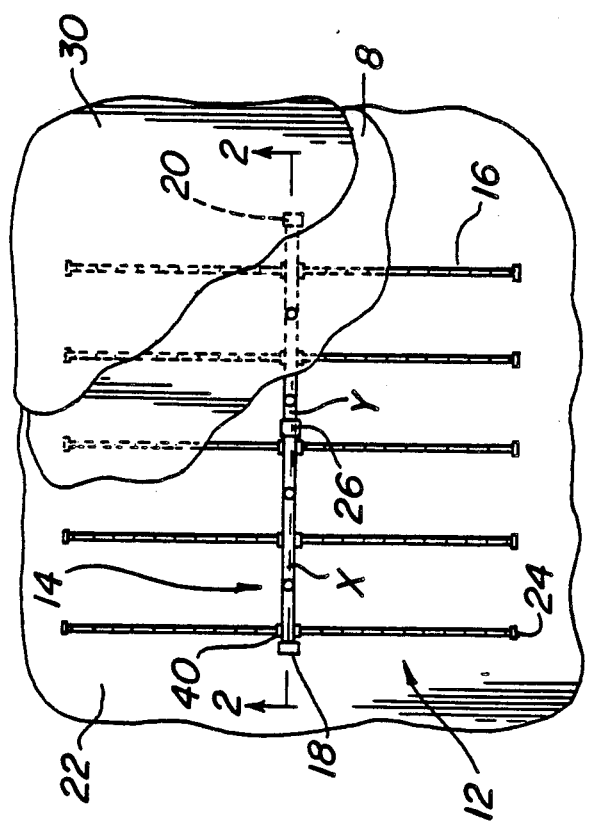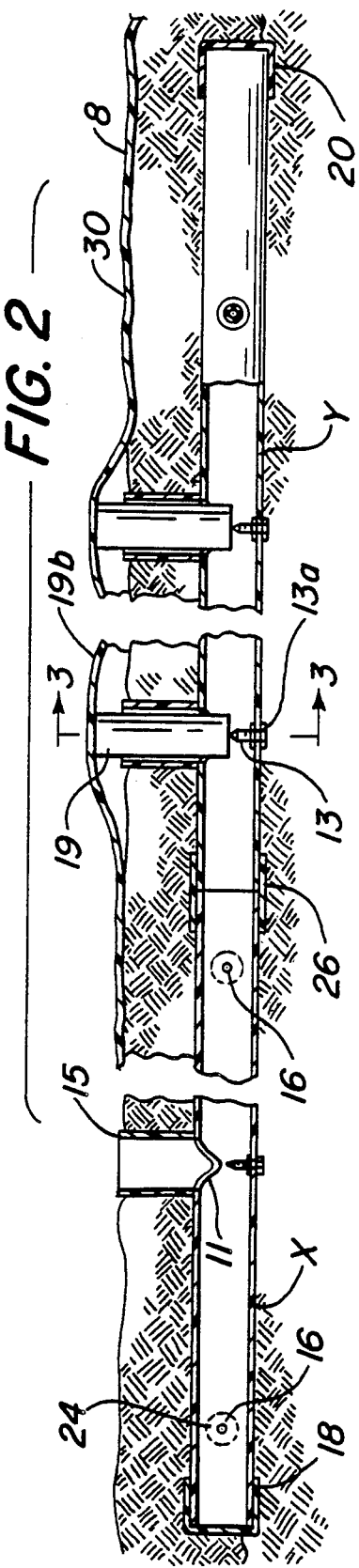

SOIL STERILIZATION APPARATUS

BACKGROUND OF THE INVENTION

1. Field of the Invention

In general, this invention relates to a soil-sterilizing apparatus which may be used to prepare soil for small plant growth or seed germination.

2. Description of the Prior Art

One known method for sterilizing soil employs steam to destroy organisms, insects and fungii which are injurious to plant growth; however, this method is not widely used because it requires expensive steam generating equipment. Moreover, the costs and delays associated with steam generation makes this system impractical for commercial purposes because it requires large amounts of fuel and inordinately high temperatures in order to produce the pressures needed for bringing the steam into intimate contact with the soil over extended periods. Accordingly, steam sterilization is usually employed only where the area to be treated is relatively small, a limitation which makes it unsuitable for use in large scale projects as, for example, in commercial landscaping projects of any magnitude.

Another known method for sterilizing soils involves the application of liquid-chemicals such as sodium methyl dithiocarbonate (i.e., VAPAM, a product of Stauffer Chemical Company, New York, N.Y.) In practice, this chemical must be applied to damp or wet soil which is then covered with an air impervious sheet for approximately two weeks. This procedure is so laborious and time consuming as to be impractical for use on anything other than small soil areas.

It is an object of this invention to provide an apparatus, which, when used with known fumigants, provides an inexpensive and practical means for converting contaminated soil into sterilized form in commercial quantities.

BRIEF DESCRIPTION OF THE INVENTION

The apparatus of this invention consists essentially of a plurality of tubular members which are arranged serially with respect to one another and which are also joined at one end to a conduit in such manner as to provide an open channel or pathway through which a fumigant gas can flow along the length of each tube. In addition, each tube is equipped with apertures which are arranged serially along the length of the tube in a uniform manner to provide an escape means for the fumigant gas.

The conduit in this apparatus includes a series of access openings for receiving individual containers or canisters of fumigant gas and each access opening includes a puncturing means for piercing the pressurized containers.

When the pressurized containers are in place within their respective access openings the sterilizing operation is commenced by placing an impervious sheet-like cover over the entire apparatus inclusive of the containers and the soil which is to be sterilized, following which the operator exerts a downward thrust upon the cover immediately above each pressurized container so as to create a punctured opening through which the fumigant gas is released. The impervious cover prevents the gas from escaping into the atmosphere and, instead, it is brought into intimate contact with the soil where it achieves the desired insecticidal and antibacterial effect. Fumigant gases vary in their effectiveness but, in general, the alkyl halide fumigants such as methyl bromide are preferred because they allow the operator to accomplish the soil-sterilizing operation within a relatively short period of time which, in most cases, does not exceed 24 hours.

BRIEF DESCRIPTION OF THE DRAWINGS

FIG. 1 is a plan view of the soil sterilization apparatus together with partial views of the soil and cover components of this invention.

FIG. 2 is a sectional view along line 2—2 of FIG. 1 showing a longitudinal view of the apparatus.

DESCRIPTION OF THE PREFERRED EMBODIMENTS

Figure 3:
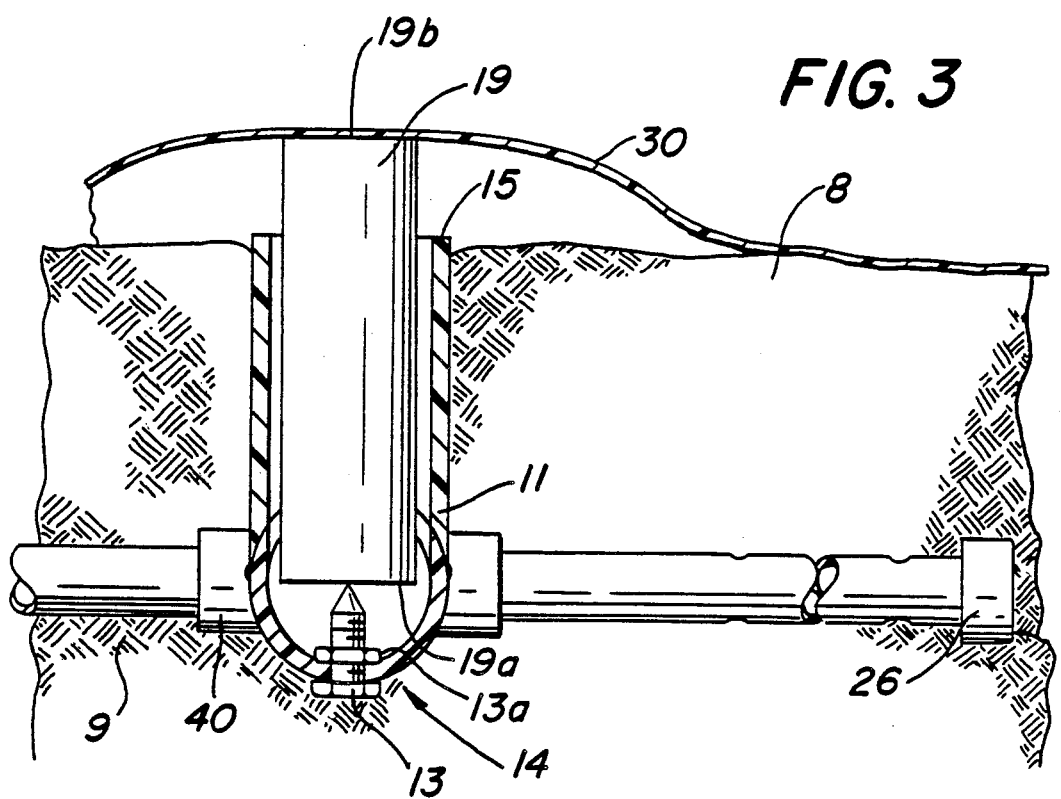
FIG. 3 is a sectional view along line 3—3 of FIG. 2 and depicting the apparatus in an unpressurized state prior to initiating the soil sterilization process of the invention.

Referring to FIG. 1 of the Drawings, a soil sterilization apparatus 12 is depicted, which consists of a three inch diameter conduit member 14 that is orthogonally coupled to several three-quarter inch diameter tubular members as, for example, member 16. The conduit 14 is ten feet in length in a preferred embodiment and consists of two, five foot sections X, Y, which are joined to one another in one form by a threaded coupling device 26, or in an alternative arrangement by utilization of a press fitted coupling. The orthogonal members 16, which include several typical one-eighth inch apertures 22, are five feet in length and are also connected to either side of the conduit member 14 by typical threaded or press fitted coupling devices 40 to provide a total span of ten feet. It has been determined that the amount of soil that may be optimally sterilized covers an area of one hundred square feet and accordingly, the apparatus 12 is designed to span linear dimensions of ten feet by ten feet. These dimensions are considered exemplary only and may readily be adapted to particular circumstances in accordance with the skill of the art. The threaded or press fitted coupling device 26 between the conduit 14, and the coupling 40 connecting the conduit to the orthogonal members 16 allows for ease of assembly; furthermore, disassembly is easily achieved for convenient storage purposes by the coupling scheme of this invention, which enhances the overall utility of the disclosed apparatus 11. The conduit 14 is terminated at either end by the caps 18, 20 and the uncoupled ends of the plurality of tubes 16 are terminated by a plurality of similar caps, for example, cap 24 to enable the apparatus 12 to become pressurized, and to relase the sterilant gas through the apertures 22 for soil sterilization purposes. The actual arrangement of the apertures 22 may be clearly viewed by referring to the sectional view of FIG. 4 wherein a typical aperture is shown as having two components consisting of an upwardly facing opening A and a downwardly facing opening B. The purpose of the upwardly and downwardly facing openings A, B will become readily apparent hereinafter. The soil sterilization apparatus 12 of this invention is easily and economically fabricated from metal, for example, copper or plastic such as P.V.C. (polyvinyl chloride) both of which are impervious to and will not interact with the gaseous fumigant or sterilant being used.

Located along conduit 14 at approximately every six inches and between adjacent tubes 16 are access openings 11 for inserting identical cylindrical receivers 15. Each receiver 15 is adapted to retain in position an exemplary pressurized canister 19 (see FIG. 2) of a gaseous methyl halide fumigant such as methyl bromide. The sectional view of FIG. 2 depicts the receiving members 15 as being positioned within access openings 11 and between adjacent tubes 16. It is well within the purview of those skilled in the art that the location and number of canisters 19 employed may be varied in accordance with the pressure requirements of the fumigant gas being utilized with apparatus 12, as well as the time desired for sterilizing the soil without departing from the spirit of the invention. A sharply pointed threaded member 13 in the form of a one-quarter inch bolt is located directly beneath the receivers 15 and is adjustable by a simple turning motion; in addition, the bolt may be fixed in place by a locking nut 13a.

FIG. 2 further illustrates that the pressurized canisters 19, which are located within respective receivers 15, are in a resting position upon the adjustable pointed bolt 13. The bolts 13 are adjustable for the purpose of locating the bottom 19a of the canisters 19 in juxtaposition to the pointed portion of the bolt when in the inactive state, or when the apparatus 12 is not being pressurized with the funigant gas. The receivers 15 and containers 19 are arranged with respect to each other so that the containers jut into space above the topmost surface of the receivers when the former are resting upon the pointed bolts 13. In an actual embodiment, the containers 19 are six and three-sixteenth inches in length whereas the receivers 15 are approximately one inch shorter. The containers 19 are pressurized with alkyl halide fumigant gas such as, for example, methyl bromide for the purpose of destroying weed seeds, insects, nematodes and fungi including pathogenic and saprophytic bacteria and other such micro-organisms in unsterilized soils. As may be well appreciated, sterilized soils are necessary in the floral and plant growing industry to provide a proper medium in order that seeds and seedlings be allowed to germinate and flourish.

Referring again to FIG. 1, a system for sterilizing soil is disclosed, which consists of the apparatus 12 in combination with a quantity of unsterilized soil 9 and a tarpaulin or cover 30. The system provides that the apparatus 12 be placed upon the pile of unsterilized soil 9 after which it is covered with additional soil 8 and then surrounded with the cover 30. The top layer of soil 8 is partially shown in covering the apparatus 12 but it is understood that the soil entirely covers the conduit 14 as well as all of the orthogonal tubes 16. The top soil layer 8 is deposited upon the apparatus 12 to a height of just below the topmost surface of the receivers 15 as may be seen in the sectional views of FIGS. 2, 3 and 4. The cover 30 comprises a six mil or thicker plastic material made, for example, of polyethylene, polypropylene or similar material for positioning upon the top layer of soil 8.

When the soil sterilization system of this invention is ready to be changed from an inactive or passive state to an active one, the pressurized containers 19 are placed in their receivers 15 (see FIGS. 2, 3) so that they respectiely rest upon pointed bolt 13. This arrangement is shown in FIG. 3 wherein the bottom section 19a is illustrated as being positioned upon the pointed end of the bolt 13 so that the canister 19 juts into the atmosphere and above the top surface of the receiver 15. The plastic cover 30, which is impervious to the transmission or leakage of a gas, is shown in FIG. 3 as having a hump-like profile directly above the canister 19. The uneven profile of the cover 30 is significant to the operation of the disclosed soil sterilization system because it clearly locates the positioning of each canister 19 over the one-hundred square foot area intended to be covered by the apparatus 12 of FIG. 1 as will be appreciated by the discussion hereinafter.

Figure 4:
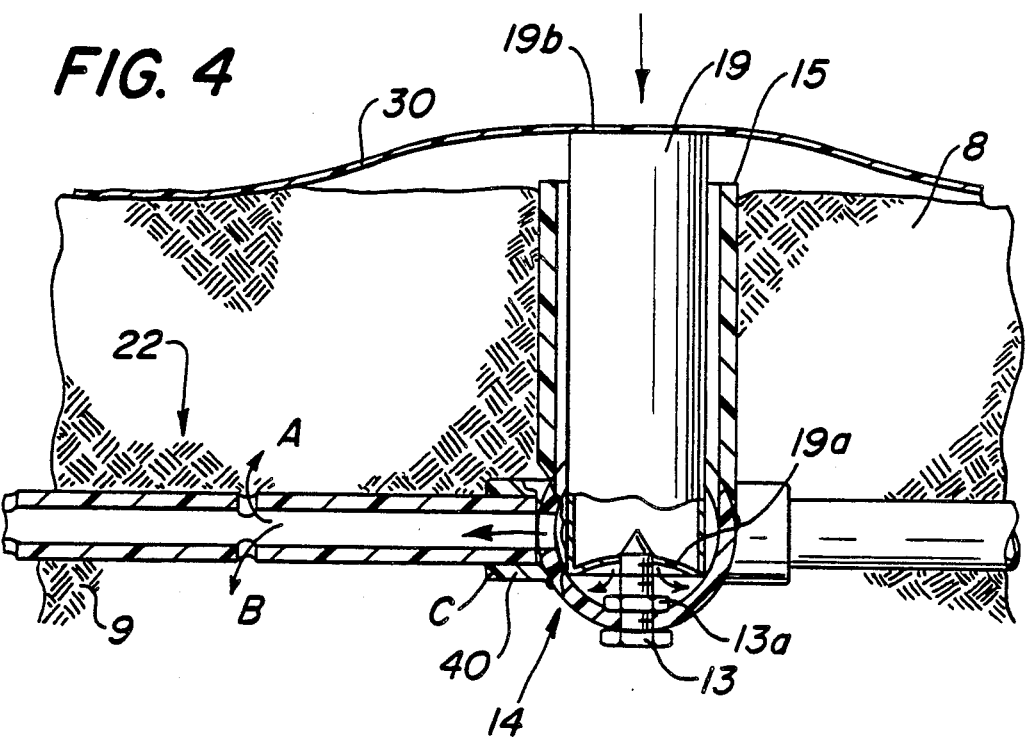
FIG. 4 is a sectional view along line 3—3 but with the apparatus in a pressurized state with the unsterilized soil undergoing the sterilization process.

Upon loading the pressurized canisters 19 of methyl bromide into receivers 15 and subsequently covering the top layer of soil 8 with the tarp 30 as depicted in FIG. 3, the system is activated and the apparatus 12 pressurized by a manual downward thrust upon the top 19b of canisters, which is clearly visible as a hump through the tarp 30, in order to rupture the bottom section 19a. This downward thrust is illustrated in FIG. 4 by the arrow and the rupture is shown by the penetration of the pointed bolt 23 through the bottom surface 19a of canister 19. The rupture of the canister 19 causes a release of the pressurized gaseous fumigant through the distribution system comprising the apparatus 12 and apertures 22. In essence, the pressurized gas in the form of the methyl bromide is released into the conduit 14 and into the tubes 16 through an opening C after which it passes through typical openings A, B of aperture 22. The fumigant, which is released through the openings A, B, is designed for permeating upwardly and downwardly the unsterilized soil layers 8, 9 in order to destroy all forms of insects, bacteria and micro-organisms that prevent the proper growth and development of seeds and seedlings. The cover 30 prevents the gaseous fumigant from the canister 19 from being dissipated quickly into the atmosphere and allows the sterilant to remain in contact with the particles comprising the unsterilized soil 8, 9 for as long a period as possible. After a period of approximately twenty-four hours, the unsterilized soil becomes sterilized and is ready for use as a potting, greenhouse or environmentally pure soil mixture.

In summary, there has been disclosed a system for use in a garden nursery environment that enables unsterilized soil to be rapidly converted to sterilized soil in a rapid and economical manner. The system is further characterized by its ability to convert relatively small portions of soil to the sterilized state by a system and apparatus that is easily portable, convenient, light weight and adapted for easy storage until required for the next usage. The invention further satisfies a need that is eminently suitable for sterilizing relatively small batches of soil for use by small nurseries. The invention eliminates the need for large capital investments required for equipment such as for steam generation that is beyond the means of the small entrepreneur.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. An apparatus for sterilizing unsterilized soil which comprises:
   (a) a length of enclosed conduit means;

(b) a plurality of tubular means wherein each tube is closed at one end, and their respective second ends are coupled along the length of said conduit means, and wherein each of said tubular means includes a plurality of apertures along its length, (c) said apertures being directed in an upward and downward direction;

(d) means further coupled to said conduit means for controllably releasing a pressurized and premeasured quantity of fumigant through said apertures for permeating said unsterilized soil to cause it to become sterilized; and (e) said coupled means being partially located within said conduit means for facile distribution of said fumigant throughout said tubular means.

2. The apparatus in accordance with claim 1 wherein certain of said plurality of tubular means are serially coupled to said conduit means in pairs.

3. The apparatus in accordance with claim 1 wherein said conduit and tubular means are made of polyvinyl chloride.

4. The apparatus in accordance with claim 1 wherein said coupled means is located approximately intermediate said adjacently positioned tubular means and comprises means for receiving the puncturing an enclosed and pressurized fumigant container.

5. The apparatus in accordance with claim 4 wherein said pressurized fumigant containers are positioned with respect to said receiving means to allow for individualized activation.

6. The apparatus in accordance with claim 4 wherein said receiving means includes a pointed means located within said tubular means for penetrating said pressurized fumigant containers.

7. The apparatus in accordance with claim 6 wherein each of said pressurized fumigant containers are arranged to rest upon said pointed means and extend above said receiving means prior to penetration.

8. The apparatus in accordance with claim 7 inclusive of a cover means which is placed over said apparatus prior to the penetration of said containers.

9. The apparatus in accordance with claim 8 wherein penetration is achieved by a manual downward thrust upon the top of each individual container so as to cause said pointed means to pierce the container and release said fumigant throughout said conduit and tubular means for distribution through said apertures into said unsterilized soil.

10. The apparatus in accordance with claim 1 wherein said plurality of tubular means is orthogonally coupled to said conduit means.

11. The apparatus in accordance with claim 4 wherein said container is pressurized with a methyl halide gas.

12. The apparatus in accordance with claim 11 wherein said methyl halide gas comprises methyl bormide.

13. A system for sterilizing soil comprising:

(a) a quantity of unsterilized soil;

(b) a distribution means in the form of a single conduit means and a plurality of extending tubular means having a plurality of patterned upwardly and downwardly directed openings and arranged for positioning upon a quantity of unsterilized soil;

(c) a receiving means including a piercing means periodically and vertically located within said single conduit means, (d) said piercing means being located approximately midway within said conduit means;

(e) pressurized fumigant containers located within each said receiving means wherein said respective containers project above said receiving means and rest upon said piercing means when said fumigant is not being distributed; and (c) a cover means positioned over said soil, distribution means and fumigant containers, whereby the individualized activation of said pressurized containers by a manually downward thrust causes a piercing of said container, and a releasing of a specified amount of said fumigant through said distribution means to permeate the unsterilized soil upwardly and downwardly in a controlled manner to provide sterilized soil after a relatively short time period.

14. The system in accordance with claim 13 wherein said operator may sequentially activate said pressurized container through said cover means by said manual downward thrust.

15. The system in accordance with claim 13 wherein said fumigant comprises a methyl halide gas.

16. The system in accordance with claim 15 wherein said methyl halide gas comprises methyl bromide.

17. A system for sterilizing soil comprising:

(a) a quantity of unsterilized soil;

(b) a distribution means in the form of a single conduit and a plurality of extending tubular means and said latter means having a plurality of upwardly and downwardly directed openings and arranged for positioning upon said unsterilized soil, and said conduit means including means for locating and piercing containers of a pressurized fumigant at specified locations;

(c) said piercing means being located mid-way and said fumigant container partially within said conduit means;

(d) cover means positioned over said soil distribution means and pressurized containers whereby the manual activation in a downwardly thrusting direction through said cover means causes said containers to be pierced, and said fumigant to be released within said tubular means for permeating and sterilizing said soil; and (d) said cover means preventing the rapid dispersion of said fumigant into the atmosphere.

* * * * *